US011629751B2

(12) United States Patent
Kessler et al.

(10) Patent No.: US 11,629,751 B2
(45) Date of Patent: Apr. 18, 2023

(54) CONNECTING ROD ASSEMBLY

(71) Applicant: ACHATES POWER, INC., San Diego, CA (US)

(72) Inventors: John M. Kessler, San Diego, CA (US); Marc-Ellis H. Brandt, San Diego, CA (US); Christopher L. Freestone, Poway, CA (US)

(73) Assignee: Achates Power, Inc., San Diego, CA (US)

( * ) Notice: Subject to any disclaimer, the term of this patent is extended or adjusted under 35 U.S.C. 154(b) by 0 days.

(21) Appl. No.: 16/438,949

(22) Filed: Jun. 12, 2019

(65) Prior Publication Data
US 2020/0392982 A1    Dec. 17, 2020

(51) Int. Cl.
*F16C 7/06*    (2006.01)
*F02B 75/28*    (2006.01)
*F16J 7/00*    (2006.01)

(52) U.S. Cl.
CPC .............. *F16C 7/06* (2013.01); *F02B 75/282* (2013.01); *F16J 7/00* (2013.01); *F16C 2360/22* (2013.01)

(58) Field of Classification Search
CPC ...... F16C 7/06; F16C 2360/22; F02B 75/282; F16J 7/00
See application file for complete search history.

(56) References Cited

U.S. PATENT DOCUMENTS

| | | | |
|---|---|---|---|
| 2,027,035 A * | 1/1936 | Gehres | F16J 1/14 403/152 |
| 2,757,990 A | 8/1956 | Barlow | 384/155 |
| 3,204,617 A * | 9/1965 | Hulbert | F01M 1/06 123/41.38 |
| 3,762,389 A | 10/1973 | Malina | 123/197 AB |
| 3,903,753 A | 9/1975 | Ottl et al. | |
| 4,691,590 A | 9/1987 | Geringer et al. | 74/579 |
| 6,112,642 A | 9/2000 | Jarrett et al. | 92/186 |
| 6,282,983 B1 * | 9/2001 | Evans | F16C 7/023 123/197.3 |
| 9,038,593 B1 | 5/2015 | Kessler et al. | F02B 75/28 |

(Continued)

FOREIGN PATENT DOCUMENTS

| | | | | |
|---|---|---|---|---|
| DE | 3516506 A1 * | 11/1986 | | F16C 7/023 |
| DE | 3516506 A1 | 11/1986 | | F02B 3/06 |
| DE | 3516506 C2 | 9/1989 | | F02B 75/32 |

OTHER PUBLICATIONS

Wikipedia citing Bloch, Improving Machinery Reliability, 1998, Gulf Professional Publishing, 3rd Ed., 216 (Year: 1998).*

(Continued)

*Primary Examiner* — Jacob M Amick
*Assistant Examiner* — Charles J Brauch
(74) *Attorney, Agent, or Firm* — Terrance A. Meador

(57) ABSTRACT

A connecting rod assembly has a connecting rod with a large end and a small end, a piston wrist pin, and fasteners to connect the connecting rod to the piston wrist pin and optionally one or more shims in between the connecting rod and piston wrist pin. A notch on the wrist pin allows for the seating of a flat surface on the small end of the connecting rod in the connecting rod assembly. Side walls on both the notch and the small end of the connecting rod limit twist. The connecting rod assembly allows for the adjustment of piston location in a cylinder while limiting connecting rod twist.

21 Claims, 6 Drawing Sheets

(56) References Cited

U.S. PATENT DOCUMENTS

| | | | |
|---|---|---|---|
| 9,175,725 B2 | 11/2015 | Dion et al. | F16C 33/04 |
| 9,841,049 B2 | 12/2017 | Klyza | F16C 9/04 |
| 9,926,867 B1 * | 3/2018 | Schum | F02M 26/05 |
| 10,100,928 B2 | 10/2018 | Cooper | F16F 9/32 |
| 10,415,738 B2 | 9/2019 | Herrick et al. | F16L 55/18 |
| 2015/0128920 A1 | 5/2015 | Kessler et al. | F02B 75/28 |
| 2015/0322933 A1 | 11/2015 | Hritz | F04B 25/00 |

OTHER PUBLICATIONS

Wikipedia, Shrink-fitting, Dec. 6, 2016, p. 1 (Year: 2016).*

Wikipedia Three Types of Fit citing ISO standards ISO 286-1:1988 (which has been revised by ISO to ISO 286-1:2010 but maintains the same three categories); 1988, ISO (Year: 1988).*

Wikipedia article entitled "Engineering fit", downloaded from the Internet at: <https://en.wikipedia.org/wiki/Engineering_fit>, on May 20, 2019.

ISR &Written Opinion, for PCT/US2020/036080, dated Sep. 15, 2020.

English Translation of DE Patentschrift 3516506 C2, obtained via WIPO IP Portal on Aug. 25, 2021, https://patentscope.wipo.int/search/ene/search.jsf.

"Connecting Rod." *Wikipedia*, Wikimedia Foundation, downloaded Aug. 25, 2021.

Declaration of Ryan G. MacKenzie Under Rule 132, dated Feb. 7, 2022.

Declaration of Ryan G. MacKenzie Under Rule 132, dated Oct. 3, 2022.

* cited by examiner

CONNECTING ROD ASSEMBLY

STATEMENT REGARDING FEDERALLY SPONSORED RESEARCH

This invention was made with government support under NAMC Project Agreement No.: 69-201502 awarded by the NATIONAL ADVANCED MOBILITY CONSORTIUM (NAMC), INC. The government has certain rights in the invention.

FIELD

The field of the invention relates to connecting rod construction. More specifically, the invention relates to connecting rod assemblies for use in internal combustion engines.

BACKGROUND

Twist in connecting rods, and in the pistons attached to those connecting rods, is undesirable in a piston-driven internal combustion engine while operating. Connecting rod twist can shorten the lifetime of the engine by causing excessive wear on piston and cylinder bore surfaces, as well as by causing the early failure of a connecting rod bearing. In a connecting rod with no twist, the large end and the small end of the connecting rod will lie in the same plane, that is to say that axes through the center of the bores of the large and small ends of the connecting rod will be parallel.

In an internal combustion engine, it can be desirable to customize the length of the connecting rod in a simple manner. While adjusting the length of the connecting rod, it is desirable to minimize twist in the connecting rod.

For example, in an opposed-piston engine with two crankshafts, it may be desirable to have the ability to easily adjust the piston-to-piston clearance, so that when tuning the engine for optimal crank lead, a desired piston-to-piston clearance can be achieved. To optimize the combustion performance of an opposed-piston engine, the crank lead between a pair of pistons in a cylinder can be adjusted, and during this adjustment, the piston-to-piston clearance may need to be maintained to provide a desired combustion chamber configuration as well as to avoid collision of the pistons.

SUMMARY

A connecting rod assembly for an internal combustion engine that includes features for customization of the length of the connecting rod, while controlling connecting rod twist, is shown and described herein.

The connecting rod assemblies described herein achieve both capabilities by attaching a connecting rod with a flat interfacing surface on the small end to a notch with a complementary flat interfacing surface on a wrist pin. Between the small end of the connecting rod and the wrist pin, one or more shims can be inserted to adjust the length of the connecting rod. The placement of one or more shims between flat surfaces distributes loads along the inserted shim or shims evenly and avoids fretting wear that can occur when a shim is inserted between curved surfaces. The wrist pin notch and the small end of the connecting rod can also have features that limit the connecting rod's twist, including flat sides on the connecting rod small end that engage in a transition fit with sides of the notch on the wrist pin.

DETAILED DESCRIPTION

Figure 1:
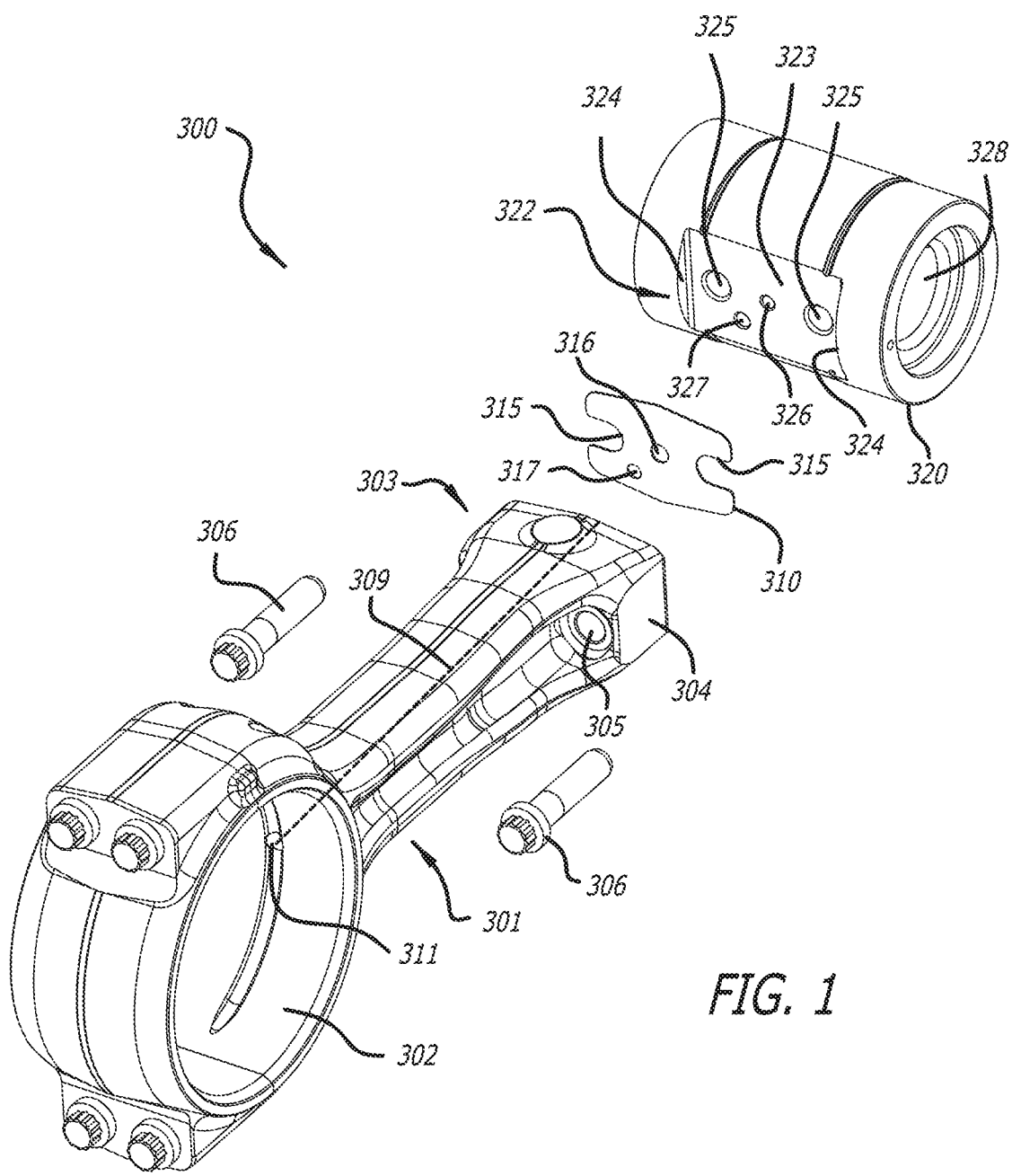
FIG. 1 shows an exploded view of a connecting rod-wrist pin assembly with twist control.

In some internal combustion engines, connecting rod assemblies are used that can both allow for an adjustable connecting rod length and minimized connecting rod twist. FIG. 1 shows this type of connecting rod assembly 300 in an exploded view, with a connecting rod 301, a shim 310, and a wrist pin 320 (also known as a gudgeon pin).

The connecting rod assembly 300 shown in FIG. 1 includes a connecting rod 301 with a large end 302 configured to connect to a crankshaft, a small end 303 with a flat (i.e., planar) top (e.g., 308 in FIGS. 3 and 4A) and flat (i.e., planar) sides 304. In the small end 303, there are openings 305 adjacent to the connecting rod sides 304. The openings 305 accommodate threaded fasteners 306 with which the connecting rod 301 is attached to the wrist pin 320. A longitudinal drilling provides an oil channel 309 to conduct a flow of oil from an opening 311 in the large end of the connecting rod to the wrist pin 320. There is a shim 310 shown in FIG. 1 with notches 315 that accommodate the threaded fasteners 306, and an oil flow opening 316 that allows oil flowing through the oil channel 309 to flow to the wrist pin 320. The shim 310 also includes an opening 317 to accommodate an orienting dowel pin. The shim 310 can be placed between the connecting rod 301 and the wrist pin 320. Use of one or more shims in the connecting rod assembly 300 is optional and allows for the customization of the connecting rod length. The wrist pin 320 has a cylindrical construction that includes a notch 322 with a flat (i.e., planar) floor 323 and flat (i.e., planar) sides 324. Additionally, the wrist pin 320 has an oil flow opening 326 that allows for oil to pass into a reservoir 328 in the wrist pin 320, as well as openings 325 for receiving threaded fasteners and an opening 327 for an orienting dowel pin in the notch floor 323.

The small end 303 of the connecting rod 301 comprises a flat seating surface that is dimensioned to fit within the wrist pin notch 322, with the sides 304 flush against the wrist pin notch sides 324. The depth of the wrist pin notch allows for a tight fit (e.g., a transition fit) between the small end 303 of the connecting rod and the notch 322 with or without a shim 310 between the small end 303 and notch floor 323. Though FIG. 1 shows one shim 310, a connecting rod assembly may have more than one shim, as needed, to adjust the length of the connecting rod.

Figure 2:
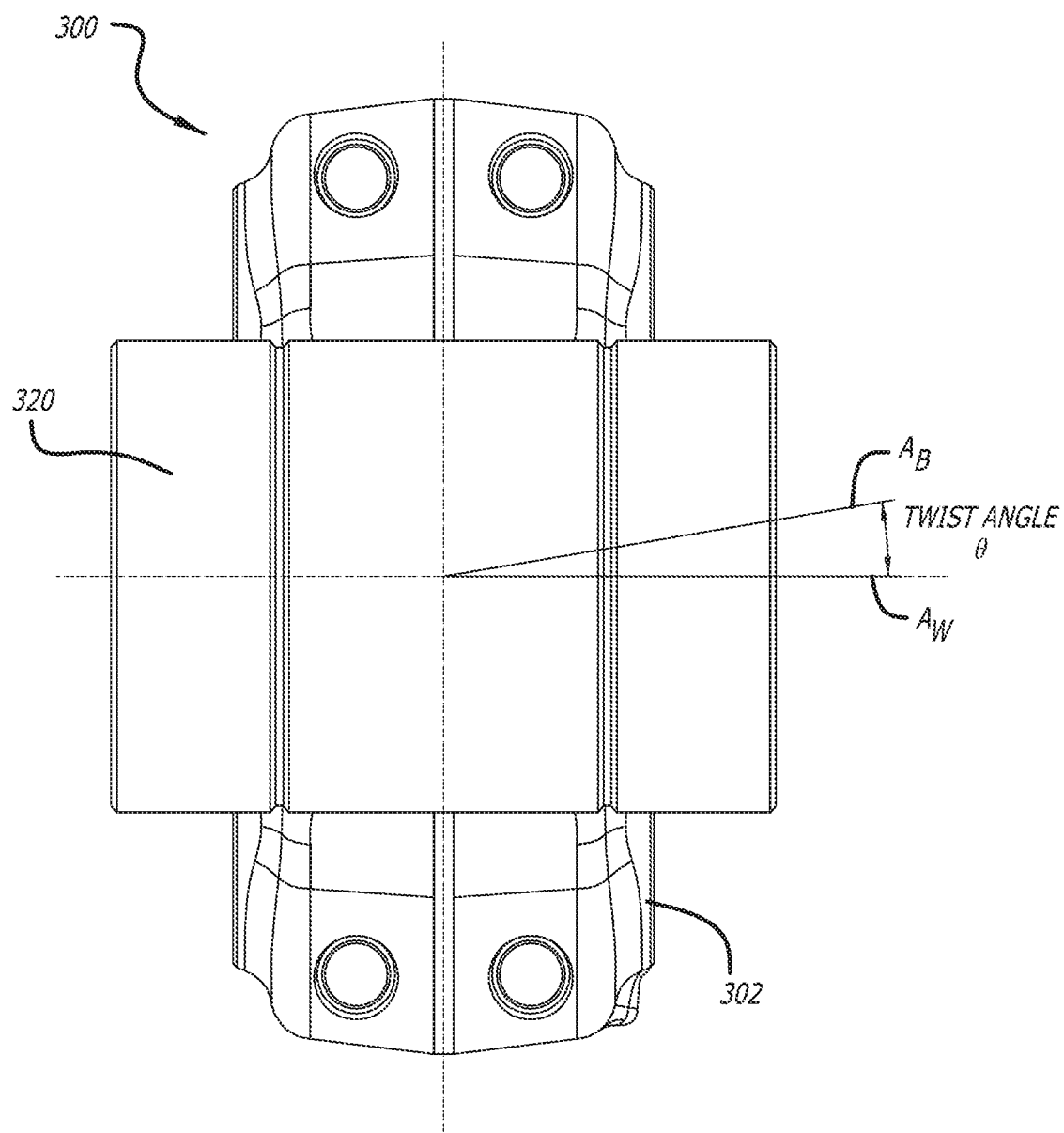
FIG. 2 shows a twist angle based on the wrist pin and a large end of the connecting rod.

A transition fit between the small end 303 of the connecting rod 301 and the wrist pin notch 323 restricts or resists torsional movement or twist of the connecting rod 301 along its length. For conventional connecting rods with bores at the small end (e.g., pin end bore) and the large end (e.g., crank end bore), there are commercial instruments that measure the parallelism between axes through the bores to determine bend and twist. The connecting rods described herein do not have the conventional small end bore, so in an assembled connecting rod assembly 300, an axis through the bore of the large end 302 and at least one axis through the wrist pin 320 are compared to determine twist. FIG. 2 shows an assembled connecting rod assembly 300 from the wrist pin 320 end of the assembly. The large end 302 of the connecting rod 301 has an axis $A_B$ through the center of its bore. The wrist pin 320 has at least one axis $A_W$ determined with respect to one or more journals, a journal being a portion of the outer surface of the wrist pin that slides along a bearing surface in the piston body. In a wrist pin with more than one journal (e.g. biaxial bearing), the axes of will be parallel. FIG. 2 shows the large end axis $A_B$, the wrist pin axis $A_W$, and the angle $\theta$ between these axes. The angle $\theta$ between the axes is the twist in the connecting rod assembly 300. Twist, or the angle $\theta$, in the connecting rod assembly can vary from 0 degrees to 0.2°, such as from 0 degrees to 0.1°.

The fit between the connecting rod's small end 303 and the wrist pin notch 323 can be a transition fit or a location transition fit, including a tight fit or a fixed fit. That is to say that a small amount of force may be exerted to fit the wrist pin to the small end. Alternatively, the fit between the small end 303 and the wrist pin notch 323 can be a similar fit for which a rubber mallet can be used to connect the connecting rod to the wrist pin. In any case, the nature of the fit between the wrist pin notch and the connecting rod small end yields an angle $\theta$, or twist, of 0.2° or less, preferably 0.1° or less.

A shim 310 for use with the connecting rod assembly 300 described herein can be any suitable thickness to obtain a desired adjustment of the length of the connecting rod or to enable a prescribed piston-to-piston clearance while adjusting crank lead between a pair of pistons in a cylinder of an opposed-piston engine. One or more shims can compensate for cumulative machining variances (i.e. tolerance stack up) in an engine. A shim can have a thickness ranging from 200 μm (0.2 mm) to 800 μm (0.8 mm), and more than one shim can be inserted between the small end of a connecting rod and a wrist pin to achieve a desired positional adjustment of a piston used with the connecting rod assembly. Preferably, a shim has a thickness of 0.5 mm. Alternatively, if no adjustment to the length of the connecting rod assembly described herein is needed for optimal engine performance, then use of a shim can be omitted.

Figure 3:
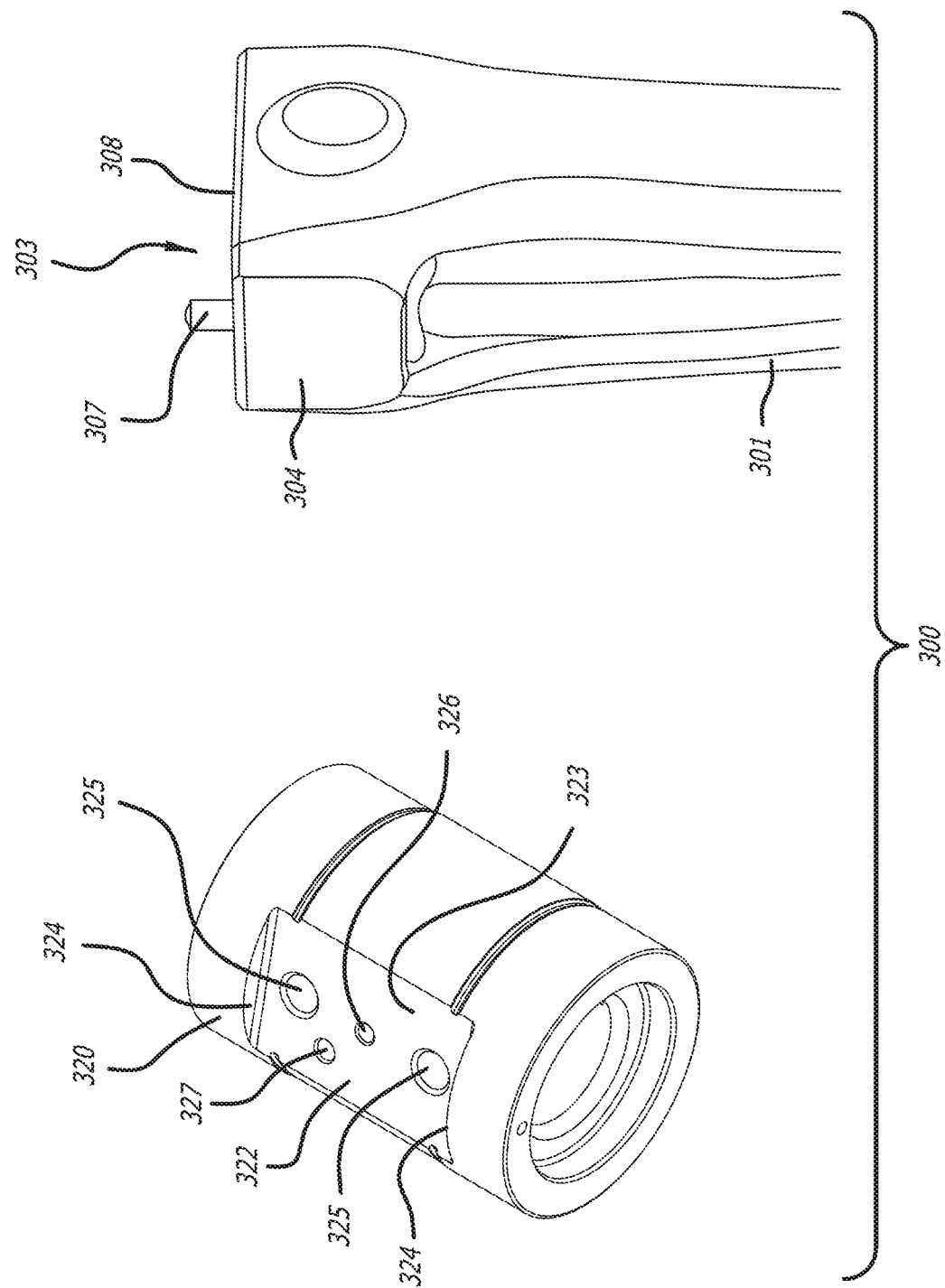
FIG. 3 shows a wrist pin and a small end of the connecting rod with twist control features.

FIG. 3 shows the wrist pin 320 and small end 303 of the connecting rod 301 of a connecting rod assembly 300, separated. The small end 303 of the connecting rod 301 is shown with a dowel pin 307 protruding from a seating surface 308. A flat side surface 304 is also visible in FIG. 3, and there is a corresponding flat side surface on the opposing side of the connecting rod. The wrist pin 320 is shown with the wrist pin notch 322 oriented upwardly in the drawing. The wrist pin 320 has a generally cylindrical construction into which the notch 322 is formed. The wrist pin notch 322 has a flat seating surface 323 with securing openings 325 that receive threaded fasteners, an oil opening 326, and an orientation opening 327 (i.e., a poke-yoke feature) that receives the dowel pin 307 protruding from the flat surface 308 of the small end 303 of the connecting rod 301. The orientation opening 327 and the dowel pin 307 ensure correct placement of the wrist pin with respect to the connecting rod. The notch 322 has sides 324 that are flat and which complement the flat side surfaces 304 of the connecting rod small end.

Figure 4A:
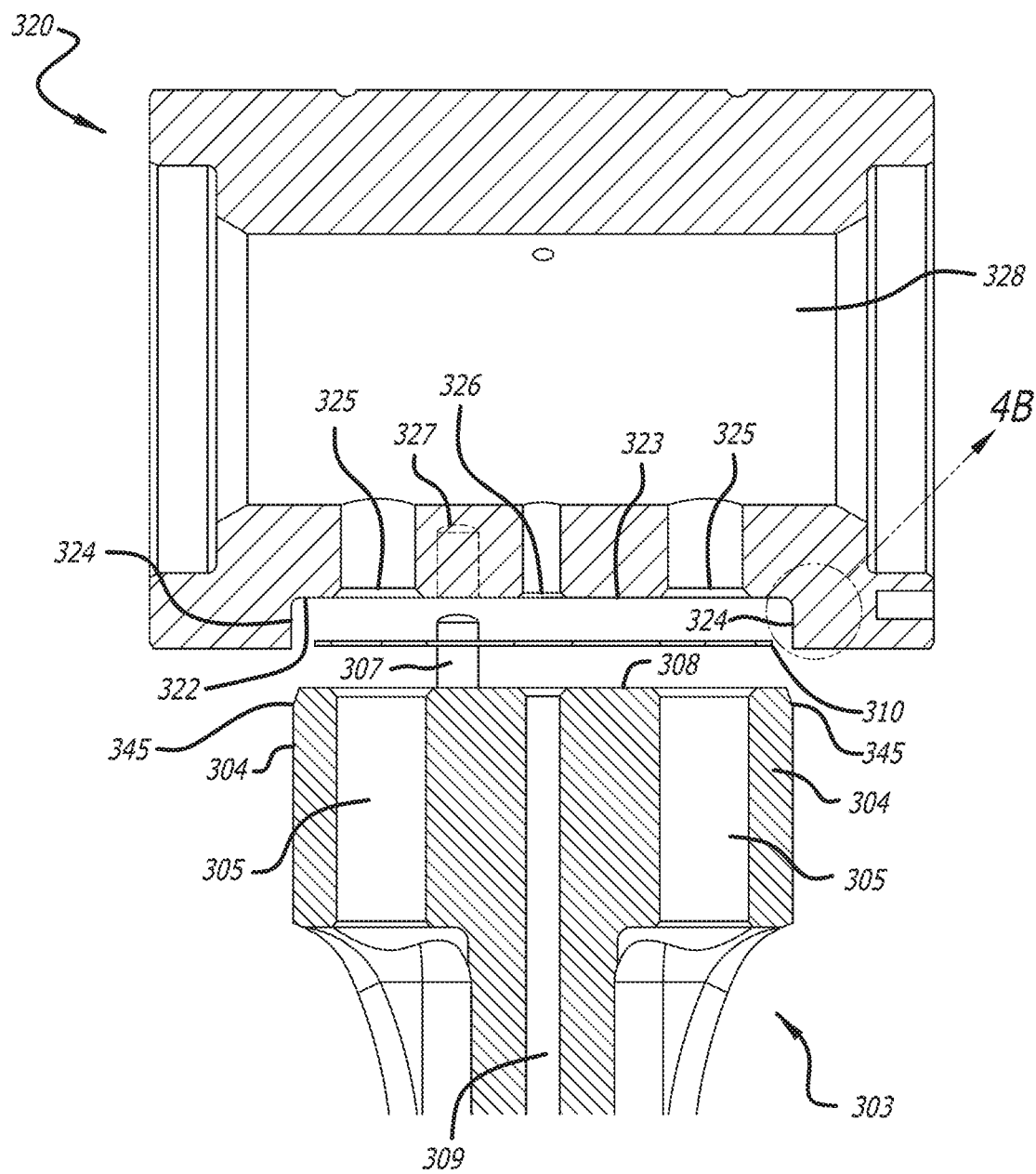
FIG. 4A shows an exploded view of the wrist pin and small end with a shim between the wrist pin and small end, taken as a section along a common midline.

FIG. 4A is an exploded view of the wrist pin and small end shown in FIG. 3 with a shim 310 between the wrist pin 320 and small end 303. This view is a sectional view along a midline of the connecting rod assembly. In addition to the wrist pin 320 and the small end 303 of the connecting rod illustrated in FIG. 3, FIG. 4 shows the shim 310 between the flat seating surface 323 of the wrist pin notch 322 and the seating surface 308 of the connecting rod. The small end 303 of the connecting rod is shown with the seating surface 308, flat side surfaces 304, openings 305 that accommodate connecting pins (e.g., threaded fasteners), and an oil channel 309. Chamfers 345 may be provided at the edges where the flat sides 304 meet the seating surface 308 of the small end 303 that accommodate any radius in the transition between the wrist pin notch flat seating surface 323 and sides 324. As per FIG. 4, the flat floor 323 and flat sides 324 of the wrist pin notch 322 align with and receive the corresponding flat sides 304 and seating surface 308 of the small end 303 so that there is a transition fit between the small end 303 and the wrist pin notch 322 that limits the twist in the connecting rod assembly 300. Further, the securing openings 325 align with the openings 305 on the small end 303. An oil opening 326 on the wrist pin 320 aligns with the connecting rod's oil channel 309. The orientation opening 327, into which the dowel pin 307 fits, is shown in dashed lines in this view, as the orientation opening 327 is off-centered with respect to the midline along which this view is taken. The shim 310 is shown with the dowel pin 307 passing through an opening (317 in FIG. 1) to align the shim 310 to both the wrist pin 320 and the connecting rod.

The wrist pin notch sides 324 and the connecting rod flat side surfaces 304 are dimensioned to minimize twist in the connecting rod assembly that results from fitting the small end of the connecting rod into the notch. The depth of the wrist pin notch 322, that is to say the height of the notch side walls 324, is sufficient to maintain the small end of the connecting rod in place to limit twist to the desired level, such as 0.2° or less, while allowing for sufficient depth of the securing openings 325 to accommodate threads that mate with threads on fasteners (the connecting pins 306 in FIG. 1) without compromising the structural soundness of the reservoir 328 that may be present in the wrist pin 320.

Figure 4B:
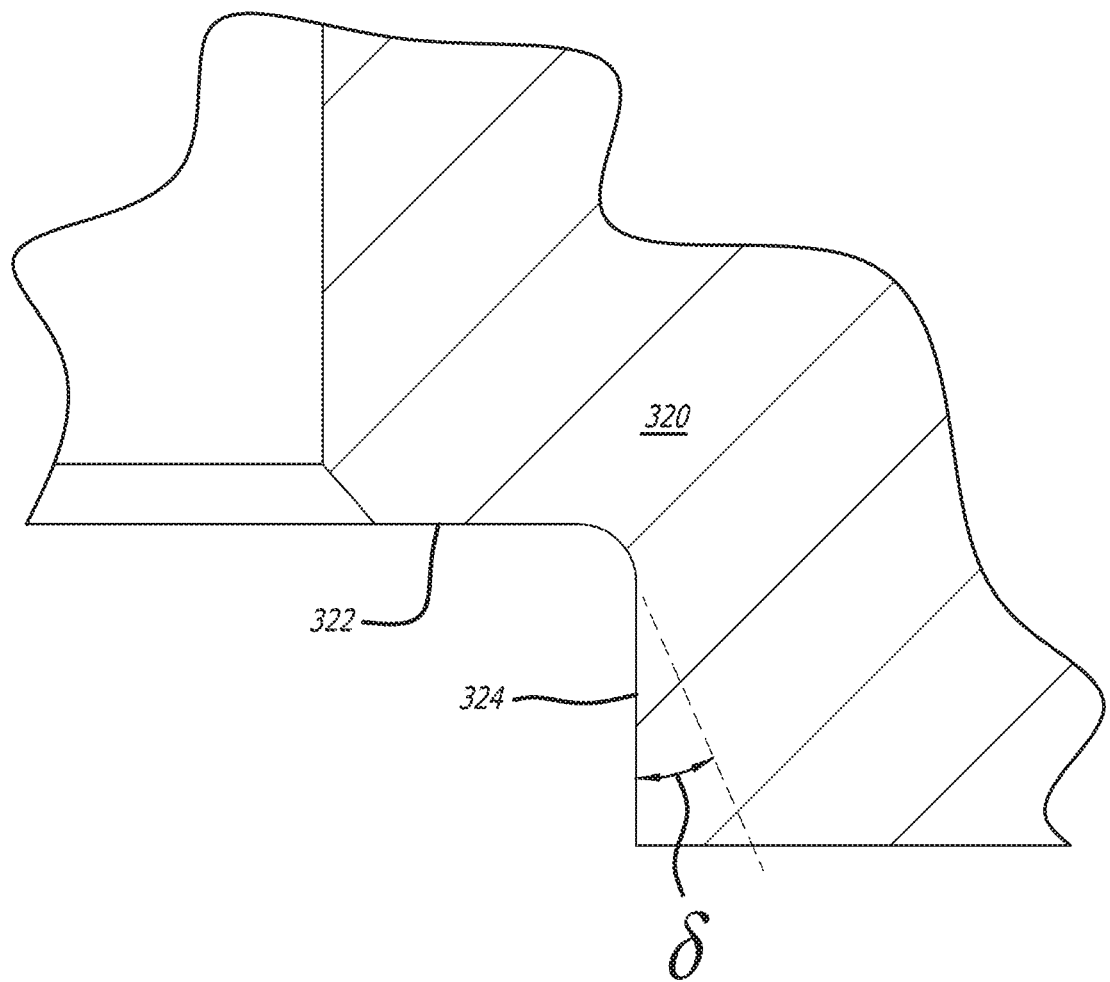
FIG. 4B shows an enlarged portion of the wrist pin notch side illustrating the variation tolerance of the angle of the side.

FIG. 4B illustrates a preferred tolerance in deviation from perfectly perpendicular with respect to the sidewall 324 of the wristpin notch 322 shown in FIG. 4A The deviation tolerance is expressed as an angle $\delta$. When the angle $\delta$ is 0°, then the sidewall 324 is flat, that is straight and vertical with respect to the midline section taken in FIG. 4A, and perpendicular to the floor 323 of the wristpin notch 322. When the angle $\delta$ is greater than 0°, the sidewall 324 is positioned such that the opening of the wrist pin notch 322 is wider than the wrist pin notch floor 323. The angle $\delta$ can range from 0° to 0.10°, preferably from 0° to 0.05°. Preferably, the sidewalls 324 of the wrist pin notch are parallel, however, variation in the wrist pin notch sidewalls 324 can differ while being within the tolerance preferred range, so that the value of $\delta$ on one sidewall can be greater than or less than that of the opposite sidewall. In some implementations, the fit between the wrist pin notch 322 and the features of the small end of the connecting rod 303 can limit twist to a value between 0.2° and 0.1°; alternatively, or additionally, the fit between the wrist pin notch 322 and small end 303 can limit twist in the connecting rod assembly to 0.1°+/−0.01°.

The configuration of the connecting rod assembly can vary with alterations to the wrist pin or the connecting rod. The depth of the wrist pin notch side walls can increase when the wrist pin is solid, instead of having an opening through its core (e.g., reservoir 328), as shown in FIG. 4A. The materials used for the connecting rod assembly may also alter the exact configuration of the components so that the relative dimensions of the wrist pin notch and the seating surface and side flats on the small end of the connecting rod may change. In any case, the transition fit between the small end and the wrist pin notch will be present in a connecting rod assembly to limit the amount of twist in the assembly.

Connecting rod assemblies such as those shown in FIGS. 1-4B can allow for optimization of a constant piston-to-piston distance in an opposed-piston engine with crank phasing. An internal combustion, opposed-piston engine with two crankshafts, as described below, can benefit by having a means for adjusting the distance between pistons at minimum volume (e.g., top dead center equivalent in opposed-piston engines) while varying crank lead in the engine, such as when optimizing engine configuration, as well as once crank lead has been optimized and fixed.

Figure 5:
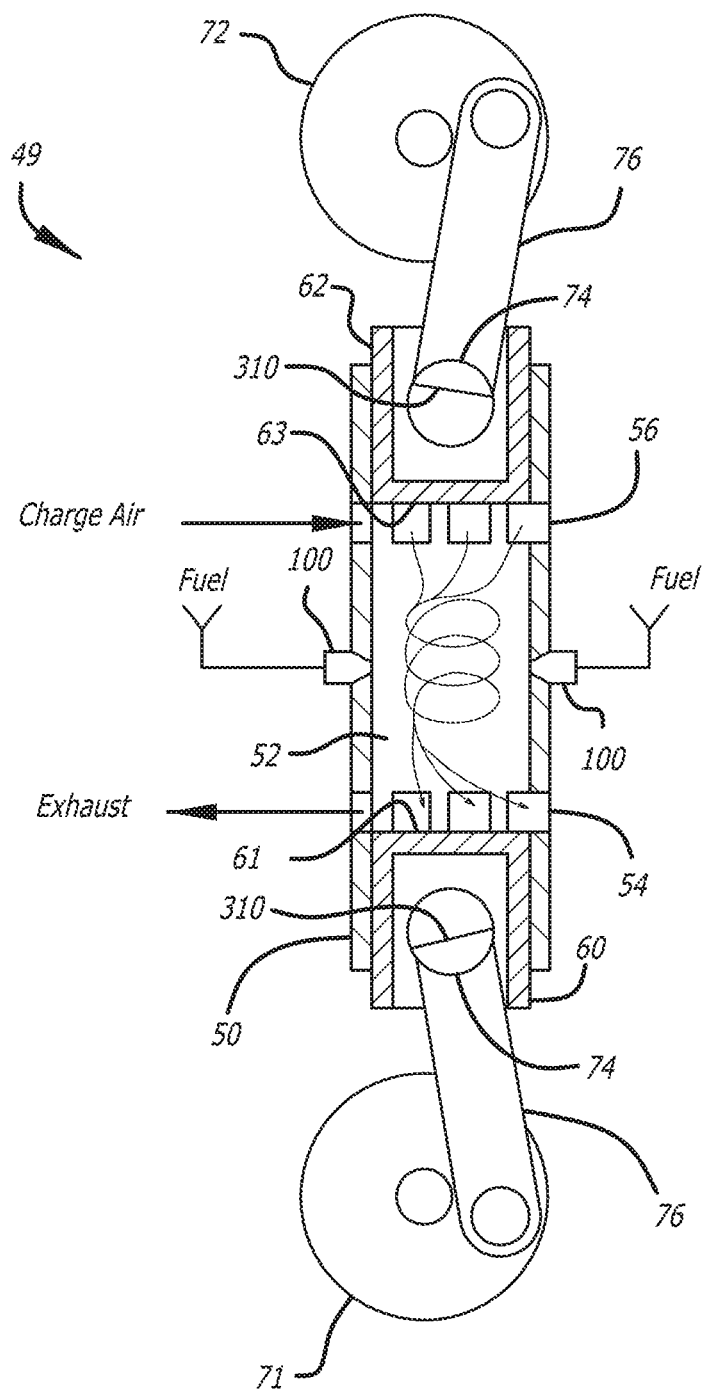
FIG. 5 is a schematic drawing of an opposed-piston engine showing use of the connecting rod-wrist pin assembly of the invention to adjust piston-to-piston clearance.

In FIG. 5 a two-stroke cycle, opposed-piston engine 49 is shown as an example of an internal combustion engine with which the invention may be used. The engine 49 includes a ported cylinder 50. The engine 49 may have one ported cylinder, two ported cylinders, three ported cylinders, or four or more ported cylinders; all possibilities are represented by the cylinder 50. The cylinder 50 includes a bore 52 and longitudinally displaced exhaust and intake ports 54 and 56, machined or formed in a sidewall of the cylinder near respective ends thereof. Each of the exhaust and intake ports includes one or more circumferential arrays of openings in which adjacent openings are separated by a solid portion of the cylinder sidewall.

One or more injection nozzles 100 are secured in threaded holes that open through the sidewall of the cylinder 50, between the intake and exhaust ports. Two pistons 60, 62 are slidably disposed in the bore 52 of the cylinder with their end surfaces 61, 63 in opposition to each other. For convenience, the piston 62 is referred to as the "intake" piston because of its proximity to, and control of, the intake port 56. Similarly, the piston 60 is referred to as the "exhaust" piston because of its proximity to, and control of, the exhaust port 54. The engine includes two rotatable crankshafts 71 and 72 that are disposed in a generally parallel relationship and positioned outside of respective intake and exhaust ends of the cylinder. The intake piston 62 is coupled to the crankshaft 72 (referred to as the "intake crankshaft"), which is disposed along an intake end of the engine 49 where cylinder intake ports are positioned; and, the exhaust piston 60 is coupled to the crankshaft 71 (referred to as the "exhaust crankshaft"), which is disposed along an exhaust end of the engine 49 where cylinder exhaust ports are positioned. In uniflow-scavenged, opposed-piston engines with a two or more cylinders, all exhaust pistons are coupled to the exhaust crankshaft and all intake pistons to the intake crankshaft.

Each of the pistons 60 and 62 is coupled to its associated crankshaft by a wrist pin 74 and a connecting rod 76 (e.g., a connecting rod assembly 300 in FIG. 1, optionally including a shim 310). When the pistons 60 and 62 of a cylinder 50 are at or near respective top center locations (e.g., top dead center equivalent locations or minimum volume locations), a combustion chamber is defined in the bore 52 between the end surfaces 61 and 63 of the pistons. Fuel is injected directly into the combustion chamber through the at least one fuel injector nozzle 100.

Operation of the opposed-piston engine 49 is well understood. Each of the pistons 60, 62 reciprocates in the bore 52 between a bottom center (BC) position near a respective end of the cylinder 50 where the piston is at its outermost position with respect to the cylinder, and a top center (TC) position where the piston is at its innermost position with respect to the cylinder. At the bottom center position, the piston's end surface is positioned between a respective end of the cylinder, and its associated port, which opens the port for the passage of gas. As the piston moves away from bottom center, toward the top center position, the port is closed. During a compression stroke each piston moves into the bore 52, away from BC, toward its TC position. As the pistons approach their TC positions, air is compressed in a combustion chamber formed between the end surfaces of the pistons. Fuel is injected into the combustion chamber. In response to the pressure and temperature of the compressed air, the fuel ignites and combustion follows, driving the pistons apart in a power stroke. During a power stroke, the opposed pistons move away from their respective TC positions. While moving from TC, the pistons keep their associated ports closed until they approach their respective BC positions. In some instances, the pistons may move in phase so that the exhaust and intake ports 54, 56 open and close in unison. However, one piston may lead the other in phase, in which case the intake and exhaust ports have different opening and closing times. In such cases, the combustion chamber may be formed when the pistons in a cylinder achieve minimum volume; that is to say when the piston crown end surfaces are closest together. Minimum volume may occur when one or both pistons in a cylinder are not at TC position.

In some instances, a phase difference is introduced in piston movements to drive the process of uniflow scavenging in which pressurized charge air entering a cylinder through the intake port pushes the products of combustion (exhaust gas) out of the cylinder through the exhaust port. The replacement of exhaust gas by charge air in the cylinder is "scavenging." The scavenging process is uniflow because gas movement through the cylinder is in one direction: intake-to-exhaust. In order to optimize the uniflow scavenging process, the movement of the exhaust piston 60 may be advanced with respect to the movement of the intake piston 62. In this respect, the exhaust piston is said to "lead" the intake piston in phase. Thus, exhaust gas flows out of the cylinder before inflow of pressurized charge air begins (this interval is referred to as "blow down"), and pressurized charge air continues to flow into the cylinder after the outflow of exhaust gas ceases. Between these events, both ports are open (this is when scavenging occurs). Scavenging ends when the exhaust port 54 closes. Now, having no exit, the charge air that continues to flow into the cylinder 50 between time of closure of the exhaust port 54 and the time of closure of the intake port 56 is caught in the cylinder 50, and is retained therein when the intake port 56 closes. This retained portion of charge air retained in the cylinder by the last port closure is referred to as "trapped air", and it is this trapped air that is compressed during the compression stroke.

Movement of the pistons in response to combustion is coupled to the crankshafts 71 and 72, which causes the crankshafts to rotate. The rotational position of a crankshaft with respect to a piston coupled to it is called the crank angle (CA). The crank angle is given as the angle from the position of the crankshaft to the centerline of the bore in which the piston moves; CA=0° when the piston is at TC. Presuming that the opposed-piston engine 49 is constructed for uniflow scavenging, a piston phase difference is established by advancing the rotational position of the exhaust crankshaft 71 relative to the intake crankshaft 72 by some fixed amount. This causes the exhaust piston 60 to lead the intake piston 62 by a corresponding amount throughout the operational cycle. During engine operation, the phase lead is maintained as the crankshafts rotate. More broadly, the term "phased crankshafts" refers to the two crankshafts of an opposed-piston engine constructed as per FIG. 5, in which the rotational movement of one crankshaft leads the rotational movement of the other crankshaft by a fixed number of degrees throughout the cycle of engine operation. This lead is referred to as "crank lead". Though the rotational movement of the crankshafts may be phased, the optimal combustion chamber configuration may require tailoring the position of one or both of the pistons to account for effects of tolerance stack up from cylinder block to piston wrist pin. One way to tailor the position of a piston is to use the connecting rod assemblies described herein.

Thus, in some opposed-piston engines, connecting rod assemblies are used that can both allow for an adjustable connecting rod length and minimized connecting rod twist. FIGS. 1-4B show this type of connecting rod assembly 300, with a connecting rod 301 and a wrist pin 320 (also known as a gudgeon pin), as well as a shim 310 that can be used to adjust connecting rod length. By using the connecting rod assemblies described herein, piston to piston distance in an opposed-piston engine can be set in an uncomplicated manner while minimizing connecting rod twist to accommodate different crankshaft phasing or crank offsets.

The scope of patent protection afforded the novel apparatus, systems, and methods described and illustrated herein may suitably comprise, consist of, or consist essentially of a connecting rod assembly in which the small end of the connecting rod includes a flat seating surface and sides that interface with a notch in a wrist pin to control twist in the assembly while allowing for the insertion of one or more shims between the flat seating surface of the connecting rod and the wrist pin notch, which is provided in some implementations. Further, the novel apparatus, systems, and methods disclosed and illustrated herein may suitably be practiced in the absence of any element or step which is not specifically disclosed in the specification, illustrated in the drawings, and/or exemplified in the embodiments of this application. Moreover, although the invention has been described with reference to the presently preferred embodiment, it should be understood that various modifications can be made without departing from the spirit of the invention. Accordingly, the invention is limited only by the following claims.

What is claimed is:

1. A connecting rod assembly comprising:
    a connecting rod with a large end and a small end with a planar top;
    a piston wrist pin with an oil reservoir;
    an oil channel in the connecting rod to conduct a flow of oil from the large end to the piston wrist pin; and,
    fasteners to connect the connecting rod to the piston wrist pin;
    wherein, the piston wrist pin comprises a notch and the small end planar top comprises a flat seating surface dimensioned to fit into the notch;
    wherein the piston wrist pin comprises an oil opening in the notch that aligns with the oil channel and allows oil to pass into the oil reservoir ;
    wherein the piston wrist pin comprises openings in the notch that receive the fasteners; and,
    wherein the small end planar top comprises a dowel pin and the notch comprises an orientation opening to receive the dowel pin.

2. The connecting rod assembly of claim 1, wherein the fit between the notch and the small end is a transition fit.

3. The connecting rod assembly of claim 1, wherein the fit between the notch and the small end limits twist in the assembly to 0.2° or less.

4. The connecting rod assembly of claim 1, wherein the notch comprises a first pair of flat side surfaces and the small end comprises a second pair of flat side surfaces, the first pair of flat side surfaces dimensioned to fit with the second pair of flat side surfaces to limit twist in the connecting rod assembly when the small end is seated in the notch.

5. The connecting rod assembly of claim 4, wherein the fit between the notch and the small end is a transition fit and further wherein a deviation in the first pair of flat side surfaces from perfectly perpendicular with respect to a flat floor of the notch ranges from 0° to 0.10°.

6. The connecting rod assembly of claim 5, wherein the fit between the notch and the small end limits twist in the assembly to 0.2° or less.

7. The connecting rod assembly of claim 1, further comprising at least one shim between the notch and the flat seating surface of the small end.

8. The connecting rod assembly of claim 7, wherein the shim has a thickness of 0.5 mm.

9. An opposed-piston engine comprising at least one cylinder with longitudinally-separated exhaust and intake ports, a pair of pistons disposed in opposition to one another in a bore of the cylinder, and two crankshafts disposed in a generally parallel relationship and positioned outside of respective intake and exhaust ends of the at least one cylinder, each piston connected to one of the two crankshafts by a connecting rod assembly, the connecting rod assembly comprising:
    a connecting rod with a large end and a small end with a planar top;
    a piston wrist pin with an oil reservoir;
    an oil channel in the connecting rod to conduct a flow of oil from the large end to the piston wrist pin; and,
    fasteners to connect the connecting rod to the piston wrist pin,
    wherein the piston wrist pin comprises a notch and the small end planar top comprises a flat seating surface dimensioned to fit into the wrist pin notch;
    wherein the piston wrist pin comprises an oil opening in the notch that aligns with the oil channel and allows oil to pass into the oil reservoir;
    wherein the piston wrist pin comprises openings in the notch that receive the fasteners; and,
    wherein the small end planar top comprises a dowel pin and the notch comprises an orientation opening to receive the dowel pin.

10. The opposed-piston engine of claim 9, wherein the fit between the notch and the small end in the connecting rod assembly is a transition fit.

11. The opposed-piston engine of claim 9, wherein the fit between the notch and the small end limits twist in the connecting rod assembly to 0.2° or less.

12. The opposed-piston engine of claim 9, wherein the notch comprises a first pair of flat side surfaces and the small end comprises a second pair of flat side surfaces, the first pair of flat side surfaces dimensioned to fit with the second pair of flat side surfaces to limit twist in the connecting rod assembly when the small end is seated in the notch in the connecting rod assembly .

13. The opposed-piston engine of claim 12, wherein the fit between the notch and the small end in the connecting rod assembly is a transition fit and further wherein a deviation in the first pair of flat side surfaces from perfectly perpendicular with respect to a flat floor of the notch ranges from 0° to 0.10°.

14. The opposed-piston engine of claim 13, wherein the fit between the notch and the small end limits twist in the connecting rod assembly to 0.2° or less.

15. The opposed-piston engine of claim 10, further comprising at least one shim between the notch and the flat seating surface of the small end.

16. The opposed-piston engine of claim 15, wherein the shim in the connecting rod assembly has a thickness of 0.5 mm.

17. A connecting rod assembly, comprising:
   a connecting rod with a large end and a small end;
   a wrist pin with an oil reservoir;
   an oil channel in the connecting rod to conduct a flow of oil from the large end to the wrist pin;
   threaded fasteners connecting the wrist pin to the small end; and
   a transition fit acting between the wrist pin and the small end to resist twist of the connecting rod along its length;
   wherein the wrist pin comprises an oil opening that aligns with the oil channel and allows oil to pass into the oil reservoir;
   wherein the piston wrist pin comprises openings within the transition fit that receive the threaded fasteners; and,
   wherein the small end comprises a dowel pin and the wrist pin comprises an orientation opening within the transition fit to receive the dowel pin.

18. The connecting rod assembly of claim 17, wherein the wrist pin comprises a notch comprising a first flat seating surface, flat sides, and securing openings that receive the threaded fasteners; and the small end of the connecting rod comprises a second seating surface and flat side surfaces; further wherein the transition fit is limited by dimensions of the wrist pin notch and the small end of the connecting rod.

19. The connecting rod assembly of claim 18, wherein the fit between the wrist pin notch and the small end limits twist in the connecting rod assembly to 0.2° or less.

20. The connecting rod assembly of claim 19, wherein the transition fit limits twist in the connecting rod assembly to about 0.1° or less.

21. The connecting rod assembly of claim 17, further comprising at least one shim between a wristpin notch and a flat seating surface of the small end of the connecting rod.

\* \* \* \* \*